LINE FINDER FOR STEP-BY-STEP TELEPHONE SYSTEM
Filed Jan. 12, 1953
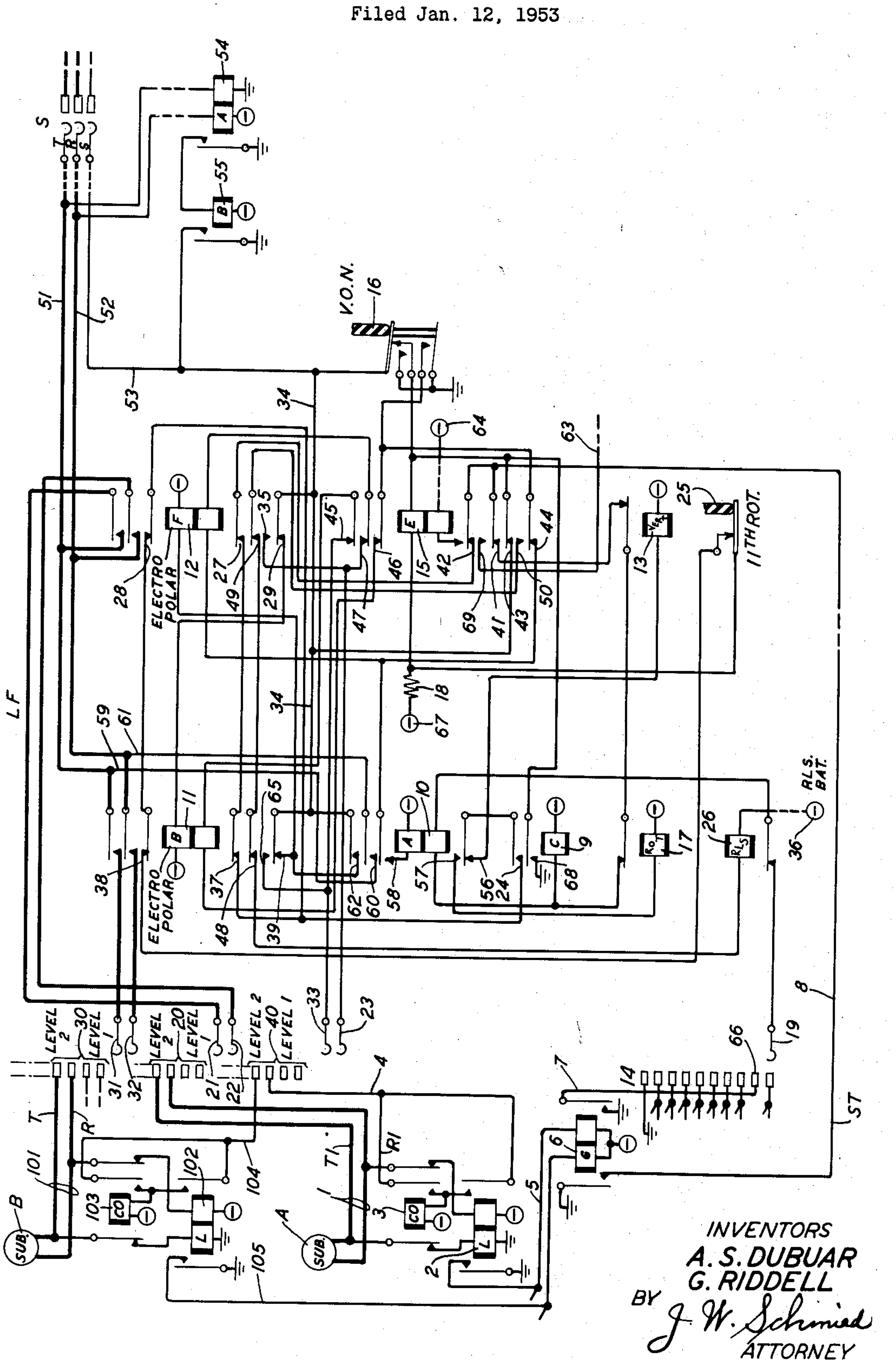
INVENTORS
A. S. DUBUAR
G. RIDDELL
BY J. W. Schmied
ATTORNEY 2,719,881

LINE FINDER FOR STEP-BY-STEP TELEPHONE SYSTEM

Arthur S. Dubuar, East Orange, N. J., and George Riddell, Westbury, N. Y., assignors to Bell Telephone Laboratories, Incorporated, New York, N. Y., a corporation of New York Application January 12, 1953, Serial No. 330,666

10 Claims. (Cl. 179—18)

This invention relates to telephone systems and more particularly to systems employing automatic switches for finding a calling subscriber's line and establishing a conversational connection to a called subscriber's line.

It is an object of this invention to improve the construction of line-finder swoitches and to render their operation more positive and reliable. It is also an object of this invention to provide a more economical line-finder switch by reducing the number of required relays while still retaining all of the required operating features.

In step-by-step telephone systems now in general use, two-motion step-by-step automatic switches having two sets of brushes are employed as line finders and two-motion step-by-step automatic switches having a single set of brushes are employed as selectors and connectors. A description of the structure of such switches is found in "Automatic Telephony" by Smith and Campbell, second edition. The subscribers' lines in a telephone system of this type are divided into groups of 200 lines, the lines of each group being connected to terminals in the banks of a corresponding group of line-finder switches. One set of brushes on each line-finder switch has access to the terminals of one-half of the lines of the group, and the other set of brushes on each line-finder switch has access to the terminals of the other half of the group. Each line is provided with a line and a cut-off relay and a start relay (also known as a group relay) is provided for every 20 lines to which both sets of brushes have access on one level. These 20 lines are known in the art as a subgroup of lines. Upon the origination of a call at any station over one of the lines of the group, the associated line relay will operate and apply battery through the winding of an associated cut-off relay to the sleeve terminal of the calling subscriber's line in the line-finder banks. This battery marks the terminals of the calling line in the banks of the line-finder. The operation of the line relay in response to the origination of a call will also operate the associated group relay which in turn will apply ground to a start lead which is multipled through every line-finder switch in the group. The ground on the start lead will actuate the first idle line-finder switch in the group and cause it to advance in a primary movement to the level in which the terminals of the calling line are located. After this level has been reached the brushes of the actuated line-finder switch are rotated in a secondary movement until one of the sets of brushes engages the battery on the sleeve terminal of the calling subscriber's line. Because only one of the two set of brushes of each line-finder switch has access to the terminals of a particular line, each line-finder switch is arranged to transfer its line conductors from one set of brushes to the other depending upon which of the two sets of brushes engages the terminals of the calling line. After the calling subscriber's line has been found by the line-finder switch, the battery applied to the sleeve terminal operates a cut-through relay in the line-finder switch which extends the calling line through the line-finder switch to a first selector switch. The first selector switch returns dial tone to the calling subscriber and places a ground on the sleeve lead back to the line-finder switch to hold the line-finder cut-through relay operated. After receiving dial tone the calling subscriber then proceeds to dial each digit of the called subscriber's designation. The first digit dialed will operate the first selector switch in the manner known in the art and when an idle trunk to a second selector switch has been found, a cut-through relay in the first selector switch will operate and extend the calling line on through the first selector switch to the second selector switch. The second selector switch will apply a ground on the sleeve lead back to the first selector switch and to the line-finder switch to hold the cut-through relays in the line finder and first selector operated. After the holding ground is applied to the sleeve lead by the second selector, the holding ground in the first selector is removed. The subscriber then dials the second digit of the called subscriber's designation and the second selector operates in a manner similar to the first selector and extends the calling line on to a third selector. The third selector will return a ground on the sleeve lead to hold the cut-through relays of the line finder, first selector and second selector operated. After the holding ground is applied to the sleeve lead by the third selector, the holding ground in the second selector is removed. As each succeeding switch in the switch train operates in response to each succeedingly dialed digit of the called subscriber's designation, it places a ground on the sleeve lead back to the preceding switches in the switch train to hold the cut-through relay in the preceding switches operated and the ground applied to the sleeve lead by the preceding switch to hold the switch train operated is removed. After dialing the last two digits of the called subscriber's designation the connector switch operates in the manner known in the art and rings the called subscriber. The connector switch in operating, places a ground on the sleeve lead and each cut-through relay in each switch of the switch train is held operated to this ground. This same ground is applied to the sleeve terminal of the calling subscriber's line in the banks of the line-finder switch as a busy ground indication.

In line finders in general use in step-by-step telephone offices, such as for example, the line finder disclosed in the patent to R. L. Stokely, No. 1,799,654, granted April 7, 1931, rotary hunting of the switch is stopped when the battery on the sleeve terminal of the calling line is found. In the operation of a line-finder switch, such as disclosed in the Stokely patent, the stepping relay of the switch operates and actuates the rotary magnet which steps the shaft and brushes around from terminal to terminal until the sleeve brush of the switch rests upon the sleeve terminal of the calling line. Battery on this sleeve terminal through the winding of the calling subscriber's cut-off relay will partially operate the cut-through relay of the line finder and will place a hold condition on the stepping relay of the line finder to prevent it from releasing the rotary magnet in preparation for another rotary step. The purpose of holding the stepping relay operated is to stop the rotary stepping of the switch for a sufficient time to permit the cut-through relay to fully operate.

A line-finder switch, hunting for the terminals of a calling line, must be able to recognize a busy terminal and step past this terminal until it finds the terminals of the calling line. It has been found that the busy ground applied to the line-finder sleeve terminals of busy lines, which a line finder in looking for the terminals of a calling line must recognize and step over, may in fact have a small potential. This busy sleeve potential is a result of the voltage drop from the battery applied through the winding of the cut-through relays in each of the switches of a switch train, through the resistance of the sleeve conductor between switches to ground at the connector switch. This busy sleeve potential presents a serious problem particularly in large step-by-step offices where the sleeve conductors are of considerable length and where the voltage drop through the resistance of the sleeve conductors is of considerable magnitude. In these offices, a line-finder switch looking for battery on the sleeve terminal of a calling line may stop its rotary huntting when one of its sleeve brushes finds this relatively large potential on a busy sleeve. The potential in some cases is large enough to place the hold condition described above on the stepping relay of the line-finder switch and thus stop the rotary hunting of the switch, yet may not be large enough to operate the line-finder cut-through relay and advance the start lead to succeeding line finders in the group. If this condition exists, the subscriber's lines in the same subgroup with the calling line (that is in the same group of 20 lines) will be prevented from initiating calls and a blocked condition will exist.

To alleviate this troublesome condition caused by high busy sleeve potentials, it has been necessary to place a maximum limit on the sleeve conductor resistance allowable in step-by-step office switch trains in order to insure that the potential applied to busy sleeves of the line-finder banks will be of insufficient magnitude to cause faulty line-finder operation. This maximum limit in many instances prevents further expansion of large step-by-step offices where the sleeve conductor resistance approaches this maximum unless cumbersome and expensive means are provided for maintaining the resistance of the sleeve conductors below this maximum critical value. Some of the larger step-by-step offices where further expansion is required have alleviated this problem by connecting 16-gauge cable conductors in parallel with the regular 22-gauge cable conductors normally used for sleeve conductors. Other offices are currently being treated by adding sleeve repeating relays in the third selectors.

Accordingly, it is an object of the present invention to provide a line-finder switch which is capable of successfully hunting over busy sleeve potentials of much larger magnitude than is permissible with line finders presently in general use. This object is achieved through the use of electropolar relays for cut-through relays in the line finder of the present invention and by the elimination of the holding feature now required in the line-finder switch in general use. The electropolar relay is a fast operating relay and has been utilized in the circuit of the line finder of the present invention in such a way that upon operating it halts the rotary stepping of the switch. Because this type of relay is a fast operated relay, there is no necessity for the holding feature required in the line finder presently in general use, as the relay becomes completely operated before the rotary stepping circuits have time to function to step the switch to the next terminal in the bank.

The electropolar relays utilized as cut-through relays in the line finder of the present invention are of the general type disclosed in Patent 1,673,884 which issued to H. C. Pye, June 19, 1928. Electropolar relays of this type have two individual windings arranged in tandem and mounted on a single core, the two windings being separated by a center pole-piece. One of the two windings of this type relay is the operating winding and the other winding is the polarizing or biasing winding of the relay. Magnetic flux from the polarizing winding will divide into two parts; one part passing through the core and armature will tend to operate the relay and the other part, passing through the back-stop and armature, will tend to keep the relay normal. The pull due to the magnetic flux through the back-stop is greater than the pull due to the magnetic flux through the core and consequently the armature does not operate. When the operating winding is energized so as to produce a magnetic flux to aid that part of the magnetic flux from the polarizing winding which passes through the core and armature, the relay will operate. If the magnetic flux from the operating winding opposes the polarizing flux, the relay remains unoperated. This type of relay operates very rapidly becaue the bulk of the magnetic flux required to operate the relay is established through the core and armature when the polarizing winding is energized; thereafter when the operating winding is properly energized the magnetic flux through the back-stop and armature (which tends to keep the relay unoperated) is decreased and the magnetic flux through the core and armature (which tends to operate the relay) is increased and the relay will snap operated very rapidly. After the relay is operated, the operating winding may be deenergized and the relay will remain operated under the influence of the polarizing winding. When it is desired to release the relay, either the operating winding may be energized to oppose the polarizing winding or the polarizing winding may be deenergized. For a more detailed description of electropolar relays of this type, reference may be made to the above-cited patent issued in H. C. Pye.

The use of line finders of the present invention in step-by-step offices will completely eliminate the above described blocking condition caused by busy sleeve potentials and will also permit the expansion of step-by-step offices because this line finder is capable of hunting successfully over higher busy sleeve potentials.

The cost of the line-finder switch of the present invention has been substantially reduced because the switch is equipped with one less electromagnetic relay than is found in the line-finder switch in general use today. This reduction is made possible by the elimination of the conventional start relay required in the line finder circuit in general use today and by operating the stepping relay of the switch directly from ground on the start lead.

The invention is illustrated in a telephone switching system using step-by-step line-finder switches each having a capacity of 200 lines, but the invention is applicable to any line-finder switch of the well-known two-motion step-by-step type utilized in any type of switching system.

The present invention is described in detail hereinafter by way of an exemplary disclosure of which the drawing forms a part. The manner in which the objects of the invention are achieved will be understood by an analysis of the following description taken in reference to the accompanying drawing.

The drawing shows schematically, calling subscribers' stations A and B placed in one group, corresponding line and start circuits, a line-finder switch embodying the features of this invention and a first selector switch illustrated in a diagrammatic manner with which the line finder is permanently associated.

Referring to the drawing, A and B represent subscriber's stations of a type usually found in automatic telephone system and each includes a dial for use in obtaining connections with any other station in the system. Subscribers' stations A and B are connected by lines 1 and 101, respectively, to terminals in the banks of a group of line-finder switches, of which only one is shown. This line-finder LF has two sets of brushes mounted on one shaft (not shown) and designated 21, 22 and 23, and 31, 32 and 33, respectively. The brushes 21 and 22 have access to terminal bank 20, the brushes 31 and 32 have access to bank 30 and brushes 23 and 33 have access to bank 40. Each bank has 100 sets of termi-
have access to bank 40. Each bank has 100 sets of termi-
nals arranged in 10 levels, 10 pairs of terminals per level. The two terminals of each pair are separated vertically the same amount as the corresponding pair of brushes; so that both brushes of a pair make contact simultaneously with both terminals of a set in any position.

Line-finder LF has two cut-through relays 11 and 12 which halt the rotary hunting of the switch and control the connections from either of the two sets of brushes to the line conductors of the succeeding switches in the switch train. Relays 11 and 12 control the connections from the two sets of brushes so that only brushes 21, 22 and 23 are operatively effective when relay 12 is operated, and only brushes 31, 32 and 33 are operatively effective when relay 11 is operated. Relays 11 and 12 are fast operate electropolar relays of the type disclosed in the above-cited patent issued to H. C. Pye. The lower winding as shown on relays 11 and 12 in the drawing are the operating windings of these relays and the upper winding as shown on relays 11 and 12 in the drawing are the polarizing windings of the relays.

Line-finder LF is provided with a vertical magnet 13 for advancing the shaft and brushes one step at a time in a vertical direction and a rotary magnet 17 is provided for rotating the shaft and brushes one step at a time over the terminals of any selected level. Stepping relay 9 is provided to cooperate with first vertical magnet 13 and then rotary magnet 17 to perform the required stepping functions. Transfer relay 10 is provided to transfer the stepping function of relay 9 from vertical magnet 13 to rotary magnet 17 after the switch has stepped vertically to the desired level. Relay 15 is provided to advance the line-finder start circuit to the next succeeding line finder in the group. A release magnet 26 is provided for releasing the shaft so that the brushes may be returned to their normal position after completion of a call. Line-finder LF also includes a commutator 14 and associated brush 19 which is attached to the shaft (not shown) so as to make contact successively with each of the commutator segments during the vertical movement of the shaft and brushes. Ground from the start circuit is applied to the particular commutator segment corresponding to the level in which the terminals of the calling line are located. The vertical stepping of the switch will continue until brush 19 reaches the grounded commutator segment. Whereupon the rotary magnet is then made effective to rotate the brushes successively from one set of terminals to the next in the selected level until the terminals of the calling line are reached.

The invention will be most readily understood from a detailed description of the operation.

Assume that a subscriber at station A initiates a call. When the receiver is removed from the receiver hook at station A, line relay 2 operates in an obvious circuit from ground through the left-hand winding of relay 2, through the left-hand back contact of relay 3, over the T1 conductor of line 1, through the substation loop of station A, over the R1 conductor of line 1, through the right-hand back contact of relay 3, through the right-hand winding of relay 2 to battery. Relay 2 in operating closes a circuit for the operation of group relay 6 over conductor 5. Relay 2 in operating also connects battery through the winding of the cut-off relay 3, through the right-hand contacts of relay 2, over conductor 4, to the sleeve terminal of line 1 in bank 40. Relay 6 in operating closes a ground through its right-hand contacts over conductor 7 to segment 66 of commutator 14 to indicate that the terminal of line 1 which is connected to station A, the calling subscriber is located in the second level of bank 20. Relay 6 in operating also grounds the start lead 8 through its left-hand contacts.

The conductors of 100 lines, including line 1, are connected to the terminals in bank 20; and the conductors of another 100 lines, including line 101, are connected to the terminals in bank 30. The associated test or sleeve conductors of these lines are connected to the correspondingly located terminals in bank 40. Thus, line 1 is shown connected to terminals in the second level of bank 20, line 101 is shown connected to terminals in the second level of bank 30. The sleeve conductor 4 of line 1 is connected to the lower terminal of the pair which is located in the corresponding position in the second level of bank 40 and the sleeve conductor 104 of line 101 is connected to the upper terminal of this pair in bank 40. The start (group) relay 6 or any of the other start relays associated with lines connected to banks 20 or 30 connects ground to start conductor 8 which leads successively through all the busy line finders of the associated group to the stepping relay of the first idle line-finder switch.

Assume now that line-finder LF is the first line-finder switch in the group which is idle and, therefore, the ground on start lead 8 from operated group relay 6 will cause the operation of relay 9. The circuit for energizing relay 9 may be traced from ground on start lead 8 through back contact 41 of relay 15, through the back contact of the vertical magnet 13, through the back contact of rotary magnet 17, to the winding of relay 9 and battery. Ground from start lead 8 is also applied to the left-hand side of the upper winding of relay 15 to prevent relay 15 from operating when the switch steps off-normal and closes the upper front contact of vertical off-normal springs 16. (The vertical off-normal springs 16 will be hereinafter referred to as VON springs 16.) The circuit for this shunting ground may be traced from ground on start lead 8, through back contact 42 of relay 15, through back contact 27 of relay 12, through back contact 37 of relay 11, through back contact 28 of relay 12, through back contact 38 of relay 11, through the back contact of the "11th rotary step" spring 25, to the left-hand side of the upper winding of relay 15. This ground acts as a shunt for relay 15 and prevents battery 67 through resistor 18 from operating relay 15 when VON springs 16 operate to close their upper front contact after the switch steps off-normal.

After the shunting ground is applied to the left-hand side of the upper winding of relay 15, as described above, and before the switch steps off-normal sufficiently to open the upper back contact of VON springs 16, a circuit is completed for the energization of relay 15 which might operate were it not for the action as hereinafter described of relay 9. This energizing circuit for relay 15 (which is shunted so as to be ineffective by relay 9 while the switch is stepping off-normal and then opened at the upper front contact of VON springs 16 after the switch steps off-normal) may be traced from the shunting ground applied to the left-hand side of the upper winding of relay 15, through the upper winding of relay 15, through the upper back contact of the VON springs 16, over conductor 34, through back contact 29 of relay 12, through the upper winding of relay 11 to battery and from the same ground on conductor 34, through back contact 39 of relay 11, through the upper winding of relay 12 to battery. Relay 9 in operating applies a ground through its front contact 68 to the right-hand side of the upper winding of relay 15 to prevent relay 15 from operating. Relay 9 is a fast operated relay and applies this shunting ground to the right-hand side of the upper winding of relay 15 during the time the switch is stepping off-normal to prevent relay 15 from operating. After the switch steps off-normal and the upper back contact of VON springs 16 is opened, the shunting ground from relay 9 is no longer required as this energizing circuit for relay 15 is opened.

Relay 9 in operating also closes a circuit for the operation of vertical magnet 13. The circuit for operating vertical magnet 13 may be traced from ground on start lead 8, through back contact 42 of relay 15, through back contact 27 of relay 12, through back contact 37 of relay 11, through front contact 24 of relay 9, through back contact 56 of relay 10, through the winding of vertical magnet 13 to battery. The operation of vertical magnet 13 raises the shaft and all multiple and commutator brushes up to the first level and opens the circuits which energized relay 9. When relay 9 releases, it opens the energizing circuit of the winding of vertical magnet 13 thereby causing the release of vertical magnet 13. The release of vertical magnet 13 in turn closes the circuit for energizing relay 9 which in turn reoperates and reenergizes the winding of the vertical magnet 13. Each reoperation of vertical magnet 13 will raise the shaft and multiple brushes one step. This cycle continues until the commutator brush 19 is raised and comes in contact with a commutator segment which has been grounded by lead 7.

When the switch is stepped off-normal or raised the first step, VON springs 16 will operate and furnish a ground for biasing the polarizing winding of electropolar relays 11 and 12. This circuit may be traced from ground at VON springs 16, through the upper front contact of VON springs 16, through back contact 43 of relay 15, over conductor 34, through back contact 29 of relay 12, through the upper winding of relay 11 to battery and from the same ground on conductor 34, through back contact 39 of relay 11, and through the upper winding of relay 12 to battery. As described hereinbefore, the application of a potential to the polarizing winding of an electropolar relay will not cause the operation of the relay but will merely produce a flux in the core of the relay which will enable the relay to operate very rapidly when a potential of correct polarity is applied to its operating winding. Therefore relays 11 and 12 remain unoperated at this time.

The operation of the VON springs 16 also prepares a circuit for the operation of relay 15 by providing a ground on the right-hand side of the upper winding of relay 15. Relay 15 does not operate at this time because of the shunting ground on the left-hand side of the upper winding as hereinbefore described.

As shown in the drawing, the commutator segment 66 of the second level was grounded by the operation of the group relay 6. Therefore, when the vertical magnet 13 steps the switch shaft to the second level, commutator brush 19 will find a ground. This ground will operate relay 10 and hold relay 9 operated. The circuit from ground on commutator segment 66 through relays 9 and 10 may be traced from battery on the right-hand winding of relay 9, through the lower winding of relay 10, through the back contact of release magnet 26, through commutator brush 19, through commutator segment 66 over conductor 7, to ground on the right-hand front contact of relay 6.

Relay 10 in operating transfers the start ground on lead 8 from the operating circuit of vertical magnet 13 to the operating circuit of rotary magnet 17, the transfer 57 taking place between front contact 56 and back contact 57 of relay 10. After operation, relay 10 locks operated to a ground from VON springs 16. The locking circuit for relay 10 may be traced from battery through the upper winding of relay 10, through front contact 58 of relay 10, through back contact 44 of relay 15, through the lower front contact of VON springs 16 to ground. Relay 10 is made slow in operation to give a short time between the last vertical step and the first rotary step of the shaft and multiple brushes to prevent snagging of the brushes due to vibration.

The circuit for operating rotary magnet 17, after operation of relay 10, may be traced from battery through the winding of rotary magnet 17, through front contact 57 of relay 10, through front contact 24 of relay 9, through back contact 37 of relay 11, through back contact 27 of relay 12, through back contact 42 of relay 15, to ground on start lead 8.

The operation of rotary magnet 17 advances the multiple brushes to the first set of terminals in the selected level and opens the circuit for the operation of relay 9 at the back contact of rotary magnet 17. As the brushes are rotated to the first set of terminals, commutator brush 19 is rotated away from commutator segment 66 and the ground for the energization of relay 9 from commutator segment 66 is removed. Relay 9 releases, opening the circuit for the energization of rotary magnet 17, which in turn releases. When rotary magnet 17 releases, it closes a circuit for the reoperation of relay 9 from battery, through the winding of relay 9, through the back contact of rotary magnet 17, through the back contact of vertical magnet 13, through back contact 41 of relay 15, to ground on start lead 8. Relay 9 in reoperating closes a circuit for the reoperation of rotary magnet 17 when front contact 24 of relay 9 closes. This cycle will continue and the multiple brushes will be moved from terminal to terminal in the selected level of the banks until one of the sleeve wipers 23 or 33 rests on the terminal to which battery was applied through the winding of cut-off relay 3 or 103. In this case, because it was assumed that the subscriber at station A originated a call, battery through cut-off relay 3 was applied over conductor 4 to a lower sleeve terminal in the second level of bank 40. Therefore, brush 23 will find a battery on this bank terminal which will cause the operation of relay 12.

Returning again to the operation of relay 10; when relay 10 operates it places a short between conductors 51 and 52 leading to selector switch S of the switch train and causes the operation of relay 54 in selector switch S. The circuit for the operation of relay 54 in the selector S may be traced from ground through the right-hand winding of relay 54, over conductor 51, over conductor 59, through front contact 60 of relay 10, over conductor 61, over conductor 52, through the left winding of relay 54 to battery. The operation of relay 54 closes an obvious circuit for the operation of relay 55 in selector switch S. The operation of relay 55 places a ground on the sleeve conductor 53 between line finder LF and selector switch S and on conductor 34. The ground thus applied to conductor 34 will be utilized to hold the line finder on the required terminals as will be hereinafter described.

The operation of relay 10 will also close a shunting path by means of front contact 62 of relay 10, around back contact 39 of relay 11. It will be observed that the circuit for energizing the polarizing winding of relay 11 extends through back contact 29 of relay 12, over conductor 34, through back contact 43 of relay 15, through upper front contact of VON springs 16 to ground. Similarly, the circuit for energizing the polarizing winding of relay 12 extends through back contact 39 of relay 11 to the same ground on conductor 34. The purpose for shunting back contact 39 of relay 11, which is in the energizing circuit of the polarizing winding of relay 12, is to provide a preference for relay 12 in the event two subscribers whose terminals appear on the same level and in the same rotary position, one in the upper and the other in the lower bank, have simultaneously originated a call. Under this condition, both brushes 23 and 33 will find a battery in the second level of bank 40 and both will attempt to cause relays 11 and 12 to operate. The start of the operation of relay 12 from battery on brush 23 will open the energizing circuit of the polarizing winding of relay 11 at back contact 29 of relay 12 and cause the release of relay 11. Similarly the start of the operation of relay 11 from battery on brush 33 will open the energizing circuit of the polarizing winding of relay 12 at back contact 39 of relay 11 and cause the release of relay 12. Thus there will be a tendency for these two relays to chatter. Therefore, relay 10 in placing a shunt around back contact 39 of relay 11 will insure that if this calling condition should exist, relay 12 will become completely operated which in turn will completely release relay 11. The shunt placed around back contact 39 of relay 11 by the closure of front contact 62 of relay 10 when relay 10 operates thus prevents any tendency of relay 11 in operating to open the energizing circuit of the polarizing winding of relay 12 in the event that the operating windings of both relays 11 and 12 are simultaneously energized.

As hereinbefore described, the rotary magnet steps the shaft and the multiple brushes around until one of the sleeve brushes 23 or 33 rests on a sleeve terminal which is connected to battery through the winding of the cut-off relay 3 or 103 in a line circuit. If brush 33 finds this battery, relay 11 operates and locks operated through its polarizing winding to ground on the sleeve conductor 53 from selector switch S. The operating circuit for relay 11 may be traced from battery through the winding of the cut-off relay 103, through the right-hand front contact of line relay 102, over sleeve conductor 104, through the upper terminal of the second level in bank 40, over sleeve brush 33, through back contact 45 of relay 15, through the lower winding of relay 11, through back contact 46 of relay 15, through the lower front contact of the VON springs 16 to ground. If brush 23 finds this battery, relay 12 operates and locks operated through its polarizing winding to ground on the sleeve conductor 53 from the selector switch S. The operating circuit for relay 12 may be traced from battery through the winding of cut-off relay 3, through the right-hand front contact of line relay 2, over sleeve conductor 4, through the lower terminal in the second level of bank 40, over sleeve brush 23, through back contact 47 of relay 15, through the lower winding of relay 12, through back contact 44 of relay 15, through the lower front contact of VON springs 16 to ground. The locking circuit for relay 11 may be traced from battery through the upper or polarizing winding of relay 11, through back contact 29 of relay 12, over conductor 34, over sleeve conductor 53, through the front contact of relay 55 to ground. The locking circuit for relay 12 may be traced from battery through the upper or polarizing winding of relay 12 through back contact 39 of relay 11 or through front contact 62 of relay 10, over conductor 34, over sleeve conductor 53, through the front contact of relay 55 to ground.

As stated hereinbefore, cut-through relays 11 and 12 are electropolar relays and being such are extremely fast operate relays. When rotary magnet 17 operates to rotate the shaft and multiple brushes to the sleeve terminal which is connected to battery through the winding of the cut-off relay in the line circuit of the calling subscriber's line, this battery will energize the operating winding of the electropolar cut-through relays 11 or 12 and the energized relay will completely operate before rotary magnet 17 has time to release and reoperate to rotate the shaft and brushes an additional step to the next terminal. In operating, electropolar relays 11 or 12 open the energizing circuit of rotary magnet 17 which prevents further rotary stepping of the shaft and brushes as described hereinafter. Because relays 11 and 12 are fast operated relays, there is no requirement for a holding condition to halt further rotary stepping of the switch while cut-through relays 11 or 12 are operating.

As assumed hereinbefore, subscriber A originated the call, therefore battery will be connected to the lower terminal of the second level in bank 40 and will cause the operation of relay 12 as above described. Relay 12 will lock operated through its polarizing winding to ground on sleeve conductor 53 from selector switch S as above described.

Relay 12 in operating opens its back contact 27 which deenergizes rotary magnet 17 before it has time to reoperate and therefore stops any further rotary stepping of the switch. Relay 12 in operating also opens its back contact 28 to remove the shunting ground from the left-hand side of the upper winding relay 15, thus permitting relay 15 to operate. Relay 12 in operating also closes the line conductors of line 1, through terminals of bank 20, through brushes 21 and 22, through the two upper front contacts of relay 12, to line conductors 51 and 52 leading to the selector switch S.

Relay 12 in operating applies ground to the terminal of sleeve conductor 4 in contact with brush 23 to operate cut-off relay 3 in the line circuit associated with the calling subscriber's line. The circuit for the operation of cut-off relay 3 in the line circuit of subscribers' station A may be traced from ground on sleeve conductor 53 from selector switch S, over conductor 34, through front contact 35 of relay 12, through brush 23, through the lower terminal of the second level of bank 40 over conductor 4, through the right-hand front contact of line relay 2, through the winding of cut-off relay 3 to battery. Cut-off relay 3 locks operated to the same ground on sleeve conductor 4 (from selector switch S) which operated relay 3. The locking circuit for cut-off relay 3 may be traced from battery through the winding of cut-off relay 3, through the right-hand front contact of relay 3, to ground on sleeve conductor 4 from selector switch S.

The operation of cut-off relay 3 in response to ground applied to sleeve conductor 4 when relay 12 operated will release line relay 2. The release of the line relay 2 will in turn release group relay 6 which will remove ground from start lead 8.

The operation of relay 12 opens the energizing circuit of the polarizing winding of relay 11, as hereinbefore described, to prevent the operation of relay 11 should battery be applied to sleeve brush 33. The operation of relay 12 also opens the circuit for the operation of the release magnet 26, thus preventing its operation until after the completion of the call as will be hereinafter described. The operating circuit for the release magnet 26 may be traced from release battery 36, which is supplied through a supervisory relay in an alarm circuit (not shown) for the purpose of providing an alarm if the line finder fails to release, through the winding of release magnet 26, through back contact 48 of relay 11, through back contact 49 of relay 12 (this contact opens when relay 12 operates), through front contact 50 of relay 15 (when operated), through lower front contact of VON springs 16 to ground.

When a call is originated at station B, line relay 102 operates to cause the operation of group relay 6 (over conductor 105) and to connect battery through the winding of cut-off relay 103 over sleeve conductor 104 to the sleeve terminal of line 102 in bank 40. Group relay 6 will operate and apply ground to start lead 8 and to segment 66 of commutator 14 over conductor 7 as described above. The operation of line finder LF in searching for the calling line is now the same as described above when a call originated at station A except that relay 11 will be operated when sleeve brush 33 comes to rest on the terminal in bank 40 to which battery is connected through the winding of cut-off relay 103 over sleeve conductor 104.

Relay 11 in operating performs functions similar to those described above with respect to relay 12. Relay 11 will lock operated through its polarizing winding to ground on sleeve conductor 53 from selector switch S as hereinbefore described. Relay 11 in operating opens its back contact 37 which deenergizes rotary magnet 17 and stops the rotary stepping of the switch as described above. Relay 11 in operating opens its back contact 38 to remove the shunting ground from the left-hand side of the upper winding of relay 15, thus permitting relay 15 to operate. Relay 11 in operating also closes the line conductors of line 101, through terminals of bank 30, through brushes 31 and 32, through the two upper front contacts of relay 11, to line conductors 51 and 52 leading to selector switch S. Relay 11 in operating applies ground to sleeve conductor 104 connected to brush 33 to operate cut-off relay 103 in the line circuit of subscriber's station B. Cut-off relay 103 locks operated to this same ground on sleeve conductor 104 and releases line relay 102. Line relay 102 in releasing releases group relay 6 which removes ground from start lead 8.

The operation of relay 11 will also partially open the energizing circuit for the polarizing winding of relay 12 by opening back contact 39 and relay 11. As hereinbefore described a shunt around contact 39 on relay 11 is provided by front contact 62 and relay 10. The operation of relay 11 also opens its back contact 48 which is in the energizing circuit of release magnet 26 to prevent release magnet 26 from operating until after the completion of the call as will be hereinafter described.

As described hereinbefore, relay 15 is prevented from operating by the presence of the shunting ground applied through back contact 28 of relay 12, through back contact 38 of relay 11, and through the back contact of the "11th rotary step" springs 25 to the left-hand side of the upper winding of relay 15. As previously described the operation of relay 12 in response to a call originated from station A, or the operation of relay 11 in response to a call originated from station B, will open this shunting circuit and permit relay 15 to operate. The operating circuit for relay 15 may be traced from battery 67, through resistance 18, through the upper winding of relay 15, through the upper front contact of VON springs 16 to ground.

Relay 15 in operating closes its front contact 50 to partially close the energizing circuit for release magnet 26, the energizing circuit for release magnet 26 presently remaining open at either back contact 48 of relay 11 or back contact 49 of relay 12 depending upon which of these two relays is operated. Relay 15 in operating also closes its front contact 69 to advance the start lead 8 over conductor 63 to succeeding line finders in the same group with line finder LF. Relay 15 in operating also opens its back contacts 45 and 47 to open the energizing circuit of the operating winding of relays 11 and 12 respectively. As previously described relays 11 or 12 when operated from battery over sleeve conductors 104 or 4, respectively, lock operated through their respective polarizing windings to ground over sleeve conductor 53 from selector switch S and after locking operated their operating windings may be deenergized without affecting the operated condition at the relays. Therefore relay 15 in opening the energizing circuit of the operating winding of relays 11 and 12 will have no effect upon the operated one of these relays and, will insure that the unoperated one will not become operated.

Relay 15 in operating also opens its back contacts 41 to open the energizing circuit of relay 9 and opens its back contact 44 to open the locking circuit of relay 10. Relays 9 and 10 release and restore to normal.

After the operation of relay 15, as described above, no further operation takes place in the circuit of line finder LF until the connection is released by the calling party. The terminals of the calling line have been found by line finder LF and the conductors of the calling line have been advanced or cut through to succeeding selector switch S. Line finder LF has applied a busy ground condition to the sleeve terminal of the calling line; the ground being supplied from the succeeding switches in the switch train. The circuit of the busy ground may be traced from ground applied to sleeve conductor 53 through the front contact of relay 55 in selector switch S, over conductor 34, through front contact 35 of relay 12, through brush 23 to the sleeve terminal in bank 40 (if station A originated the call) or over conductor 34, through front contact 65 of relay 11, through brush 33 to the sleeve terminal in bank 40 (if station B originated the call).

Assume again that the call has been originated from subscriber's station A and that the terminals of line 1 have been found and cut through to the succeeding switches in the switch train by line finder LF and that the succeeding switches have functioned in the manner known in the art to complete a connection to the called party. Assume further that subscriber at station A has completed the call and has replaced the receiver on the receiver hook thus releasing the connection. When the connection is released by the calling subscriber at station A, ground is removed from sleeve conductor 53 in the succeeding equipment or switching train and relay 12 will release. Relay 12 in releasing will close its back contact 49 to complete a circuit for energizing release magnet 26. The circuit for energizing release magnet 26 may be traced from release battery 36, through the winding of release magnet 26, through back contact 48 of relay 11, through back contact 49 of relay 12, through front contact 50 of relay 15, through lower front contact of VON springs 16 to ground. Release magnet 26 operates to release the shaft and multiple brushes to permit them to return to normal. When the shaft and brushes reach their normal position, ground on the front contacts of VON springs 16 is disconnected thereby releasing release magnet 26 and removing ground from the right-hand side of the upper winding of relay 15. Relay 15 remains operated during the releasing operation of release magnet 26 to ground through the upper front contact of VON springs 16 until the switch restores to normal and this ground is removed. As soon as VON springs 16 restore to normal, this ground is removed from relay 15 and relay 15 releases and restores to normal.

When ground is removed from sleeve conductor 53 upon the release of the connection by subscriber's station A as above described, cut-off relay 3 in the line circuit associated with subscriber's station A will be released because, as hereinbefore described, relay 3 locked operated to this ground. The release and return to normal of cut-off relay 3 will restore the line circuit associated with subscriber's station A to normal and prepare it for operation on a succeeding call.

The operation of the circuits of line finder LF in releasing a call originated at subscriber's station B is identical to that described above with respect to the release of a call originated at station A, except that relay 11 will release when ground is removed from sleeve conductor 53. Relay 11 in releasing will energize release magnet 26 and the circuit of line finder LF will be returned to normal as described above. Cut-off relay 103 in the line circuit associated with subscriber's station B will also release and return to normal.

The purpose of the lower winding of relay 15 is to hold this relay operated if, during the time the switch is off-normal, start lead 8 should become grounded. This condition could happen if another subscriber in the same subgroup should originate a call while the switch is busy. As described hereinbefore, the line relay in the other subscriber's line circuit will operate and in turn operate group relay 6 which would ground start lead 8. This ground could therefore be applied to start lead 8 before line finder LF is restored to normal and in condition to hunt for the other calling subscriber's line. In this event, relay 15 will lock operated from battery 64 through a group alarm circuit (not shown) to the ground thus applied to start lead 8 and because relay 15 is held operated, the ground on start lead 8 will be transferred through front contact 69 of relay 15, over conductor 63 to the start lead of the succeeding line finders in the group. Relay 15 will remain locked to this ground until a succeeding line finder in the group has found the calling line and the ground is removed from start lead 8 in the manner described hereinbefore. Relay 15 will then release and restore to normal.

In case of a false ground on the start lead 8 or, if for any other reason, the calling line is not found when start lead 8 is grounded, line finder LF will advance to the eleventh rotary step and open the "11th rotary step" springs 25. When "11th rotary step" springs 25 open, the shunting ground on the left-hand side of the upper winding of relay 15 is removed and relay 15 will operate. Relay 15 in thus operating will open its back contact 42 and deenergize rotary magnet 17 to stop the rotary stepping. Relay 15 will also close a circuit for energizing release magnet 26 which will operate and release the switch in the manner described above. Relay 15 in thus operating also advances the start lead to succeeding line finders in the group as described above.

If the originating subscriber at station A for example, should disconnect before his line has been found by line finder LF, line relay 2 will release and in turn release cut-off relay 3 and group relay 6. The release of group relay 6 will remove ground from start lead 8. Removal of the ground from start lead 8 will release relay 9 and vertical magnet 13 or rotary magnet 17, depending upon whether relay 10 has operated or not. The release of relay 9 will remove the shunting ground from the left-hand side of the upper winding of relay 15 and permit relay 15 to operate. Relay 15 in operating advances the start lead to succeeding line finders in the group as described above and energizes release magnet 26 to release and restore line finder LF to normal.

If the switch is manually moved off-normal by a maintenance man in the performance of his duties, ground from VON springs 16 is applied to the upper right-hand winding of relay 15 operating the relay. Relay 15 in operating will advance start lead 8 to succeeding line finders in the group in the manner described above.

What is claimed is:

1. In a switching system a line finder comprising, a double motion step-by-step switch, a bank of terminals terminating the lines of said switching system and an associated set of contact wipers, a first relay responsive to a signal on any of said lines, primary and secondary magnets associated with said wipers and controlled by said first relay to advance said wipers in a primary and a secondary movement, a second relay operable when said wipers have completed the required primary movement for halting said primary movement and for transferring the control of said first relay from said primary stepping magnet to said secondary stepping magnet to cause said wipers to advance in their secondary movement, a third relay connected to said wipers and operable when said wipers contact the terminals of the one of said lines in said bank to which said signal has been applied to simultaneously halt the said secondary movement of said wipers and extend said one of said lines through said switch, and a fourth relay controlled by the operation of said third relay for releasing said first relay and said second relay.

2. In a telephone switching system a line finder comprising, a double motion step-by-step switch, a bank of terminals terminating the lines of said system and an associated set of contact wipers, a first relay responsive to a calling condition on any of said lines, vertical and rotary stepping magnets associated with said wipers and controlled by said first relay to advance said wipers in a vertical and a rotary movement, a second relay operable when said wipers have completed the required vertical movement for halting said vertical movement and for transferring the control of said first relay from said vertical stepping magnet to said rotary stepping magnet to cause said wipers to advance in their rotary movement, a third relay of the electropolar type connected to an off-normal spring of said switch so as to be polarized when said wipers advance off normal in their vertical movement, said third relay also being connected to said wipers and operable when said wipers contact the terminals of a calling one of said lines in said bank for simultaneously halting said rotary movement and extending said calling one of said lines through said switch, and a fourth relay controlled by the operation of said third relay for releasing said first relay and said second relay.

3. In a switching system a line finder comprising, a double motion step-by-step switch, two banks of terminals terminating the lines of said switching system and two associated sets of contact wipers, a first relay responsive to a signal on any of said lines, primary and secondary stepping magnets associated with said wipers and controlled by said first relay to advance said wipers in a primary and a secondary movement, a second relay operable when said wipers have completed the required primary movement for halting said primary movement and for transferring the control of said first relay from said primary stepping magnet to said secondary stepping magnet to cause said wipers to advance in their secondary movement, a third and a fourth relay each connected to a different set of said two sets of contact wipers and either operable when its associated set of wipers contact the terminals of the one of said lines in said banks to which said signal has been applied to simultaneously halt the said secondary movement of said wipers and extend said one of said lines through said switch, and a fifth relay controlled by the operation of either of said third or said fourth relays for releasing said first relay and said second relay.

4. In a telephone switching system a line finder comprising, a double motion step-by-step switch, two banks of terminals terminating the lines of said system and two associated set of contact wipers, a first relay responsive to a calling condition on any of said lines, vertical and rotary stepping magnets associated with said wipers and controlled by said first relay to advance said wipers in a vertical and a rotary movement, a second relay operable when said wipers have completed the required vertical movement for halting said vertical movement and for transferring the control of said first relay from said vertical stepping magnet to said rotary stepping magnet to cause said wipers to advance in their rotary movement, a third and a fourth relay each of the electropolar type and each connected to an off-normal spring of said switch so as to be concurrently polarized when said wipers advance off normal in their vertical movement, said third relay and said fourth relay also being connected to a different set of said two sets of contact wipers and either operable when its associated set of wipers contact the terminals of a calling one of said lines in said banks to simultaneously halt the said secondary movement of said wipers, to extend said calling one of said lines through said switch, and to depolarize the unoperated one of said third or said fourth relays, and a fifth relay controlled by the operation of either one of said third or said fourth relays for releasing said first relay and said second relay.

5. In a telephone switching system a line finder consisting of only five relays and a double motion step-by-step switch comprising, two banks of terminals terminating the lines of said switching system and two associated sets of contact wipers, a first relay of said five relays responsive to a calling condition on any of said lines, vertical and rotary stepping magnets associated with said wipers and controlled by said first relay to advance said wipers in a vertical and a rotary movement, a second relay of said five relays operable when said wipers have completed the required vertical movement for halting said vertical movement and for transferring the control of said first relay from said vertical stepping magnet to said rotary stepping magnet to cause said wipers to advance in their rotary movement, a third and a fourth relay of said five relays each of the electropolar type and each connected to an off-normal spring of said switch so as to be concurrently polarized when said wipers advance off normal in their vertical movement, said third and said fourth relays also being connected to a different set of said two sets of contact wipers and either operable when its associated set of wipers contact the terminals of a calling one of said lines in said banks to simultaneously halt the said rotary movement of said wipers, to extend said calling one of said lines through said switch, and to depolarize the unoperated one of said third or said fourth relays, and a fifth relay of said five relays controlled by the operation of either one of said third or said fourth relays for releasing said first relay and said second relay.

6. In a switching system a two-motion line-finder switch comprising, a bank of terminals and a corresponding set of brushes adapted to make contact with terminals in said bank when said switch is advanced in a secondary movement, a cut-through relay connected to and associated with said brushes and adapted to complete a circuit from said brushes to the line conductors of succeeding switches in said switching system, groups of lines connected to said terminals in said bank, a commutator having segments corresponding to each of said groups of lines, a commutator brush adapted to make contact with individual segments of said commutator as said switch is advanced in a primary movement, a primary magnet adapted to advance said switch in a primary movement, a secondary magnet adapted to advance said switch in a secondary movement, means responsive to a signaling condition on any line of said lines for applying a marking potential to the terminals of said line in said bank and for applying a marking potential to the segment of said commutator corresponding to the group of lines in which said line is located, a stepping relay responsive to a signaling condition on any of said lines for controlling said primary and said secondary magnets, means controlled by the operation of said stepping relay for operating said primary magnet to advance said switch in its primary movement until said commutator brush contacts a marked commutator segment, a transfer relay responsive to the marking potential applied to a marked commutator segment for halting further operation of said primary magnet and for transferring the control of said stepping relay from said primary magnet to said secondary magnet, means responsive to the operation of said transfer relay and controlled by said stepping relay for operating said secondary magnet to advance said switch in its secondary movement until said brushes contact the marked terminals of said line in said bank, means controlled by the operation of said cut-through relay in response to the marking potential applied to the terminals of said line in said bank for simultaneously halting further operation of said secondary magnet and for completing a circuit from the termination of said line in said banks to the line conductors of succeeding switches in said switching system, and an advance relay responsive to the operation of said cut-through relay for releasing said stepping relay and said transfer relay.

7. In a telephone switching system a two-motion step-by-step line-finder switch comprising, a bank of terminals and a corresponding set of brushes adapted to make contact with terminals in said bank when said switch is advanced in a rotary movement, a cut-through relay of the electropolar type associated with and connected to said brushes and adapted to complete a circuit from said brushes to the line conductors of succeeding switches in said telephone switching system, groups of lines connected to said terminals in said bank, a commutator having segments corresponding to each of said groups of lines, a commutator brush adapted to make contact with individual segments of said commutator as said switch is advanced in a vertical movement, a vertical stepping magnet adapted to advance said switch in a vertical movement, a rotary stepping magnet adapted to advance said switch in a rotary movement, means responsive to a calling condition on any line of said lines for applying a marking potential to the terminals of said line in said bank and for applying a marking potential to the segment of said commutator corresponding to the group of lines in which said line is located, a stepping relay responsive to a calling condition on any of said lines for controlling said vertical and said rotary stepping magnets, means controlled by the operation of said stepping relay for operating said vertical stepping magnet to advance said switch in its vertical movement until said commutator brush contacts a marked commutator segment, means in said switch responsive to its vertical movement for polarizing the electropolar cut-through relay, a transfer relay responsive to the marking potential applied to said marked commutator segment for halting further operation of said vertical stepping magnet and for transferring the control of said stepping relay from said vertical stepping magnet to said rotary stepping magnet, means responsive to the operation of said transfer relay and controlled by said stepping relay for operating said rotary stepping magnet to advance said switch in its rotary movement until said brushes contact the marked terminals of said line in said bank, means controlled by the operation of said electropolar cut-through relay in response to the marking potential applied to the terminals of said line in said bank for simultaneously halting further operation of said rotary stepping magnet and for completing a circuit from the terminals of said line in said bank to the line conductors of succeeding switches in said switching system, and an advance relay responsive to the operation of said electropolar cut-through relay for releasing said stepping relay and said transfer relay.

8. In a switching system a two motion step-by-step line-finder switch comprising two sets of terminal banks and two corresponding sets of brushes, each of said two sets of brushes adapted to make contact with terminals in an associated one of said two sets of banks when said switch is advanced in a secondary movement, two cut-through relays each associated with and connected to one of said two sets of brushes and adapted to close a circuit from its associated set of brushes to the line conductors of succeeding switches in said switching system, groups of lines connected to the terminals in said banks so that one set of said brushes has access to half the lines in each group, and the other set of said brushes has access to the other half of said lines in each group, a commutator having segments corresponding to each of said groups of lines, a commutator brush adapted to make contact with individual segments of said commutator as said switch is advanced in a primary movement, a primary stepping magnet adapted to advance said switch in a primary movement, a secondary stepping magnet adapted to advance said switch in a secondary movement, control means responsive to a signaling condition on any line of said lines for applying a marking potential to the terminals of said line in said banks and for applying a marking potential to the segment of said commutator corresponding to the group of lines in which said line is located, a stepping relay responsive to a signaling condition on any of said lines for controlling said primary and said secondary stepping magnets, means controlled by the operation of said stepping relay for operating said primary stepping magnet to advance said switch in its primary movement until said commutator brush contacts a marked commutator segment, a transfer relay responsive to the marking potential applied to said marked commutator segment for halting further operation of said primary stepping magnet and for transferring the control of said stepping relay from said primary stepping magnet to said secondary stepping magnet, means responsive to the operation of said transfer relay and controlled by said stepping relay for operating said secondary stepping magnet to advance said switch in its secondary movement until one of said sets of brushes contact the marked terminals of said line in said banks, means controlled by the operation of either one of said two cut-through relays in response to the marking potential applied to the terminals of said line in said banks for simultaneously halting further operation of said secondary stepping magnet and for completing a circuit from the terminals of said line in said banks to the line conductors of succeeding switches in said switching system, and an advance relay responsive to the operation of either one of said two cut-through relays for releasing said stepping relay and said transfer relay.

9. In a telephone switching system a two-motion step-by-step line-finder switch comprising, two sets of terminal banks and two corresponding sets of brushes, each of said two sets of brushes adapted to simultaneously make contact with terminals in an associated one of said two sets of banks when said switch is advanced in a rotary movement, two electropolar cut-through relays each associated with and connected to one of said two sets of brushes and adapted to close a circuit from its associated set of brushes to the line conductors of the succeeding switches in said telephone switching system, groups of lines connected to the terminals in said banks so that one set of said brushes has access to half the lines in each group and the other set of said brushes has access to the other half of said lines in each group, a commutator having segments corresponding to each of said groups of lines, a commutator brush adapted to make contact with individual segments of said commutator as said switch is advanced in a vertical movement, a vertical stepping magnet adapted to advance said switch in a vertical movement, rotary stepping magnet adapted to advance said switch in a rotary movement, control means responsive to a calling condition on any line of said lines for applying a marking potential to the terminals of said line in said banks and for applying a marking potential to the segment of said commutator corresponding to the group of lines in which said line is located, a stepping relay responsive to a calling condition on any of said lines for controlling said vertical and said rotary stepping magnets, means controlled by the operation of said stepping relay for operating said vertical stepping magnet to advance said switch in its vertical movement until said commutator brush contacts a marked commutator segment, means in said switch responsive to its vertical movement for concurrently polarizing said two electropolar cut-through relays, a transfer relay responsive to the marked potential applied to said marked commutator segment for halting further operation of said vertical stepping magnet and for transferring the control of said stepping relay from said vertical stepping magnet to said rotary stepping magnet, means responsive to the operation of said transfer relay and controlled by said stepping relay for operating said rotary stepping magnet to advance said switch in its rotary movement until one of said two sets of brushes contact the marked terminals of said line in said banks, means controlled by the operation of either one of said two electropolar cut-through relays in response to the marking potential applied to the terminals of said line in said banks for simultaneously halting further operation of said rotary stepping magnet, for completing a circuit from the terminals of said line in said banks to the line conductors of succeeding switches in said switching system, and for depolarizing the unoperated one of said two electropolar cut-through relays, and an advance relay responsive to the operation of either one of said two electropolar cut-through relays for releasing said stepping relay and said transfer relay.

10. In a telephone switching system a two-motion step-by-step line-finder switch comprising a plurality of sets of terminal banks and a plurality of sets of contact brushes, each of said sets of contact brushes adapted to simultaneously make contact with terminals in an associated set of said plurality of sets of terminal banks when said switch is advanced in a rotary movement, a plurality of electropolar cut-through relays each associated with and connected to one set of said plurality of sets of contact brushes and each adapted to close a circuit from its associated set of contact brushes to the line conductors of succeeding switches in said telephone switching system, a plurality of groups of lines connected to said terminals in said banks, a commutator having segments corresponding to each of said groups of lines, a commutator brush adapted to make contact with individual segments of said commutator as said switch is advanced in a vertical movement, a vertical stepping magnet adapted to advance said switch in a vertical movement, a rotary stepping magnet adapted to advance said switch in a rotary movement, control means responsive to a calling condition on any line of said lines for applying a marking potential to the terminals of said line in said banks and for applying a marking potential to the segment of said commutator corresponding to the group of lines in which the calling line is located, a stepping relay responsive to a calling condition on any of said lines for controlling said vertical and said rotary stepping magnet, means controlled by the operation of said stepping relay for operating said vertical stepping magnet to advance said switch in its vertical movement until said commutator brush contacts a marked commutator segment, means in said switch responsive to its vertical movement for concurrently polarizing said plurality of electropolar cut-through relays, a transfer relay responsive to the marked potential applied to said marked commutator segment for halting further operation of said vertical stepping magnet and for transferring the control of said stepping relay from said vertical stepping magnet to said rotary stepping magnet, means responsive to the operation of said transfer relay and controlled by said stepping relay for operating said rotary stepping magnet to advance said switch in its rotary movement until one of said sets of brushes contact the marked terminals of said calling line in said banks, means controlled by the operation of one of said plurality of electropolar cut-through relays in response to the marking potential applied to the terminals of said calling line in said banks for simultaneously halting further operation of said rotary stepping magnet, for completing a circuit from the terminals of said calling line in said banks to the line conductors of succeeding switches in said switching system, and for depolarizing the unoperated ones of said plurality of electropolar cut-through relays, and an advanced relay responsive to the operation of any of said plurality of electropolar cut-through relays for releasing said stepping relay and said transfer relay.

References Cited in the file of this patent

UNITED STATES PATENTS 2,552,773 Ffolliott -------------- May 15, 1951